(12) United States Patent
Zhou et al.

(10) Patent No.: US 11,035,684 B2
(45) Date of Patent: Jun. 15, 2021

(54) PATH PLANNING SYSTEM AND METHOD FOR ROBOT, ROBOT AND MEDIUM

(71) Applicant: PING AN TECHNOLOGY (SHENZHEN) CO., LTD., Shenzhen (CN)

(72) Inventors: Chen Zhou, Shenzhen (CN); Bao Zhou, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 444 days.

(21) Appl. No.: 16/084,245

(22) PCT Filed: Jun. 30, 2017

(86) PCT No.: PCT/CN2017/091370
§ 371 (c)(1),
(2) Date: Sep. 12, 2018

(87) PCT Pub. No.: WO2018/188200
PCT Pub. Date: Oct. 18, 2018

(65) Prior Publication Data
US 2021/0080272 A1 Mar. 18, 2021

(30) Foreign Application Priority Data
Apr. 11, 2017 (CN) .......................... 201710232929.0

(51) Int. Cl.
*G01C 21/34* (2006.01)
*G05D 1/00* (2006.01)
*G05D 1/02* (2020.01)

(52) U.S. Cl.
CPC ..... *G01C 21/3446* (2013.01); *G01C 21/3453* (2013.01); *G05D 1/0088* (2013.01); *G05D 1/0214* (2013.01); *G05D 2201/0217* (2013.01)

(58) Field of Classification Search
CPC ............ G01C 21/3446; G01C 21/3453; G01C 21/343; G05D 1/0088; G05D 1/0214;
(Continued)

(56) References Cited

U.S. PATENT DOCUMENTS 5,978,730 A * 11/1999 Poppen .............. G01C 21/3446
370/351
2002/0120396 A1  8/2002 Boies et al.
(Continued)

FOREIGN PATENT DOCUMENTS

CN  1350244 A   5/2002
CN  101755247 A  6/2010
(Continued)

OTHER PUBLICATIONS

Search Report of European Patent Application No. 17899233.5 dated May 10, 2019.
(Continued)

*Primary Examiner* — Jeff A Burke
*Assistant Examiner* — Joshua Alexander Garza

(57) ABSTRACT

The disclosure discloses a path planning system and method for a robot, the robot and a medium. The method includes: preselecting, by the path planning system for the robot, one or more position points from paths on which the robot can move in a predetermined regional map as reference positioning points; and if an instruction of moving the robot from a first position point to a second position point is received, analyzing a path from the first position point to the second position point according to the set reference positioning points and according to a predetermined path analysis rule,
(Continued)

and controlling the robot to move to the second position point on the basis of the analyzed path.

12 Claims, 9 Drawing Sheets

(58) Field of Classification Search
CPC ........... G05D 2201/0217; B25J 9/1666; G05B 2219/39082
See application file for complete search history.

(56) References Cited

U.S. PATENT DOCUMENTS

| | | | | |
|---|---|---|---|---|
| 2005/0216181 | A1* | 9/2005 | Estkowski | G05D 1/0212 701/411 |
| 2006/0149465 | A1 | 7/2006 | Park et al. | |
| 2008/0154430 | A1* | 6/2008 | Nakamura | G05D 1/0212 700/259 |
| 2010/0299065 | A1 | 11/2010 | Mays | |
| 2011/0035087 | A1* | 2/2011 | Kim | B25J 9/1666 701/25 |
| 2012/0232795 | A1* | 9/2012 | Robertson | G01C 22/006 701/532 |
| 2013/0325244 | A1* | 12/2013 | Wang | G06T 11/00 701/26 |
| 2014/0011518 | A1 | 1/2014 | Valaee et al. | |
| 2014/0121833 | A1* | 5/2014 | Lee | B25J 9/1666 700/255 |
| 2015/0185033 | A1* | 7/2015 | Corne | G01C 21/343 701/533 |
| 2017/0344007 | A1* | 11/2017 | Song | G05D 1/0274 |
| 2018/0267540 | A1* | 9/2018 | Sonoura | G05D 1/0221 |

FOREIGN PATENT DOCUMENTS

| | | |
|---|---|---|
| CN | 103294054 A | 9/2013 |
| CN | 103605368 A | 2/2014 |
| CN | 103838240 A | 6/2014 |
| CN | 104416569 A | 3/2015 |
| CN | 105549585 A | 5/2016 |
| CN | 105955267 A | 9/2016 |
| CN | 105974928 A | 9/2016 |
| CN | 106168803 A | 11/2016 |
| CN | 106323299 A | 1/2017 |
| CN | 106382944 A | 2/2017 |
| CN | 106547272 A | 3/2017 |
| JP | 2001060111 A | 3/2001 |
| JP | 2002133351 A | 5/2002 |
| JP | 2010134855 A | 6/2010 |
| JP | 2011175393 A | 9/2011 |
| JP | 2013045265 | 3/2013 |
| KR | 20060078162 A | 7/2006 |
| KR | 100988833 B1 | 10/2010 |
| WO | 2004067232 A2 | 8/2004 |
| WO | 2007037348 A1 | 4/2007 |
| WO | 2014033444 A1 | 3/2014 |

OTHER PUBLICATIONS

Examination report of European Patent Application No. 17899233.5 dated Feb. 12, 2020.

* cited by examiner

PATH PLANNING SYSTEM AND METHOD FOR ROBOT, ROBOT AND MEDIUM

CROSS REFERENCE TO RELATED APPLICATIONS

This application is the national phase entry of International Application No. PCT/CN2017/091370, filed on Jun. 30, 2017, which is based upon and claims priority to China Patent Application No. CN2017102329290, filed on Apr. 11, 2017 and entitled "Path Planning System and Method for Robot", which are hereby incorporated by reference in its entirety.

TECHNICAL FIELD

This disclosure relates to the technical field of computers, and more particularly relates to a path planning system and method for a robot, the robot and a computer-readable storage medium.

BACKGROUND

At present, an autonomous mobile robot may be widely applied to many scenarios, for example, working as a guide in an exhibition hall to show visitors around and introduce exhibition areas one by one, working as a waiter in a restaurant to actively welcome guests and lead the guests to unoccupied seats for ordering and working as a guide and a patroller in a public place to move along a route set by a program and stop to answer questions when someone needs help.

In these scenarios, the autonomous mobile robot is required to move to one or more specified positions to realize some specific functions, and a path planning problem for the autonomous mobile robot is involved herein. In the prior art, in terms of path calculation, the autonomous mobile robot starts calculating a path for moving to a target point in real time when receiving a movement instruction, and such a real-time calculation process requires many factors to be considered and is relatively time-consuming.

SUMMARY

A main objective of the disclosure is to provide a path planning system and method for a robot, the robot and a medium, so as to improve path planning efficiency of an autonomous mobile robot.

To achieve the above objective, a first aspect of the application provides a path planning system for a robot, the path planning system including:

a selection module, configured to preselect one or more position points from paths on which the robot can move in a predetermined regional map as reference positioning points; and a path planning module, configured to, if an instruction of moving the robot from a first position point to a second position point is received, analyze a path from the first position point to the second position point according to the set reference positioning points and according to a predetermined path analysis rule and control the robot to move to the second position point on the basis of the analyzed path.

A second aspect of the application provides a path planning method for a robot, the method including the following steps:

preselecting, by a path planning system for the robot, one or more position points from paths on which the robot can move in a predetermined regional map as reference positioning points; and if an instruction of moving the robot from a first position point to a second position point is received, analyzing a path from the first position point to the second position point according to the set reference positioning points and according to a predetermined path analysis rule, and controlling the robot to move to the second position point on the basis of the analyzed path.

A third aspect of the application provides a robot, which includes processing equipment and storage equipment, a path planning system for the robot is stored in the storage equipment, the path planning system for the robot includes at least one computer-readable instruction and the at least one computer-readable instruction may be executed by the processing equipment to implement the following operation:

preselecting one or more position points from paths on which the robot can move in a predetermined regional map as reference positioning points; and if an instruction of moving the robot from a first position point to a second position point is received, analyzing a path from the first position point to the second position point according to the set reference positioning points and according to a predetermined path analysis rule, and controlling the robot to move to the second position point on the basis of the analyzed path.

A fourth aspect of the application provides a computer-readable storage medium, on which at least one computer-readable instruction executable for at least one piece of processing equipment to implement the following operation is stored:

preselecting one or more position points from paths on which the robot can move in a predetermined regional map as reference positioning points; and if an instruction of moving the robot from a first position point to a second position point is received, analyzing a path from the first position point to the second position point according to the set reference positioning points and according to a predetermined path analysis rule, and controlling the robot to move to the second position point on the basis of the analyzed path.

According to the path planning system and method for the robot, robot and medium disclosed by the disclosure, the one or more position points are preselected from the paths on which the robot can move in the predetermined regional map as the reference positioning points; and after the instruction of moving the robot from the first position point to the second position point is received, the path from the first position point to the second position point is analyzed according to the set reference positioning points and according to the predetermined path analysis rule, and the robot is controlled to move to the second position point on the basis of the analyzed path. The robot is not required to calculate a movement path in real time during path planning, and instead, performs corresponding selection in preplanned paths, that is, a path planning process is converted from "calculation" to "selection", so that a real-time calculation amount is effectively reduced, and path planning efficiency is improved.

Achievement of the objective, functional features and advantages of this disclosure will be further described with reference to the accompanying drawings.

DETAILED DESCRIPTION

In order to make the technical problem to be solved, technical solutions and beneficial effects of the disclosure clearer, the disclosure will be further described below in detail in combination with the accompanying drawings and embodiments. It will be appreciated that the specific embodiments described herein are merely illustrative of the disclosure and are not intended to limit the disclosure.

Figure 1:
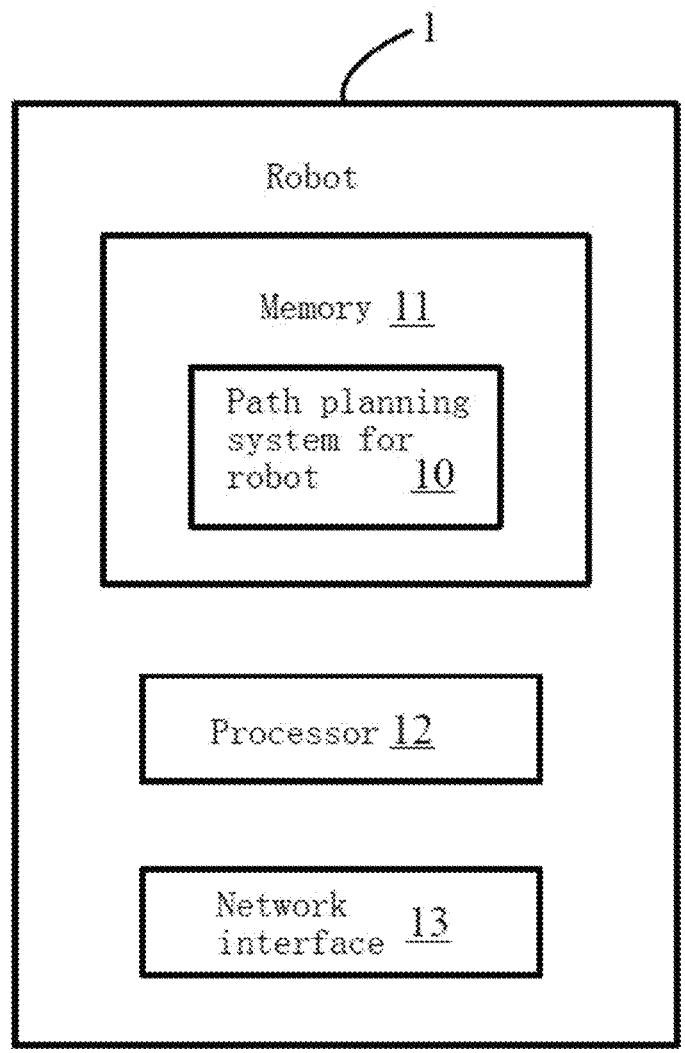
FIG. 1 is a schematic diagram of an operating environment for a preferred embodiment of a path planning system for a robot according to the disclosure.

FIG. 1 is a schematic diagram of an operating environment for a preferred embodiment of a path planning system for a robot according to the disclosure. In the embodiment, the path planning system 10 for the robot is installed and operated in the robot 1. The robot 1 may include, but not limited to, a memory 11, a processor 12 and a display 13 which form mutual communication connections through a system bus. The robot 1 with the components 11-13 is only shown in FIG. 1. It should be understood that not all of the shown components are required to be implemented and more or fewer components may be implemented instead.

Wherein, the memory 11 includes an internal memory and at least one type of readable storage medium. The internal memory provides a cache for operation of the robot 1; and the readable storage medium may be a nonvolatile storage medium such as a flash memory, a hard disk, a multimedia card and a card type memory. In some embodiments, the readable storage medium may be an internal storage unit of the robot 1, for example, a hard disk of the robot 1; and in some other embodiments, the nonvolatile storage medium may also be external storage equipment of the robot 1, for example, a plug-in type hard disk, Smart Media Card (SMC), Secure Digital (SD) card and flash card configured on the robot 1. In the embodiment, the readable storage medium of the memory 11 is usually configured to store an operating system and various types of application software installed in the robot 1, for example, a program code of the path planning system 10 for the robot in an embodiment of the application. In addition, the memory 11 may further be configured to temporally store various types of data which have been output or will be output.

The processor 12, in some embodiments, may include one or more microprocessors, microcontrollers, digital processors and the like. The processor 12 is usually configured to control operation of the robot 1. In the embodiment, the processor 12 is configured to operate the program code stored in the memory 11 or process data, for example, operating the path planning system 10 for the robot.

The display 13, in some embodiments, may be a Light-Emitting Diode (LED) display, a liquid crystal display, a touch liquid crystal display, an Organic LED (OLED) touch display and the like. The display 13 is configured to display information processed in the robot 1 and configured to display a visual user interface, for example, an application menu interface and an application icon interface. The components 11-13 of the robot 1 communicate with one another through the system bus.

The path planning system 10 for the robot includes at least one computer-readable instruction stored in the memory 11, and the at least one computer-readable instruction may be executed by the processor 12 to implement a path planning method for the robot in each embodiment of the application. As described hereinafter, the at least one computer-readable instruction may be divided into different logic modules according to different functions realized by each part.

In an embodiment, the path planning system 10 for the robot is executed by the processor 12 to implement the following operation: first, one or more position points are preselected from paths on which the robot 1 can move in a predetermined regional map as reference positioning points; and then, if an instruction of moving the robot 1 from a first position point to a second position point is received, a path from the first position point to the second position point is analyzed according to the set reference positioning points and according to a predetermined path analysis rule, and the robot 1 is controlled to move to the second position point on the basis of the analyzed path. In an embodiment, the path planning system 10 for the robot is stored in the memory 11 and includes at least one computer-readable instruction stored in the storage equipment 11, and the at least one computer-readable instruction may be executed by the processor 12 to implement the path planning method for the robot in each embodiment of the application.

The disclosure provides a path planning method for a robot.

Figure 2:
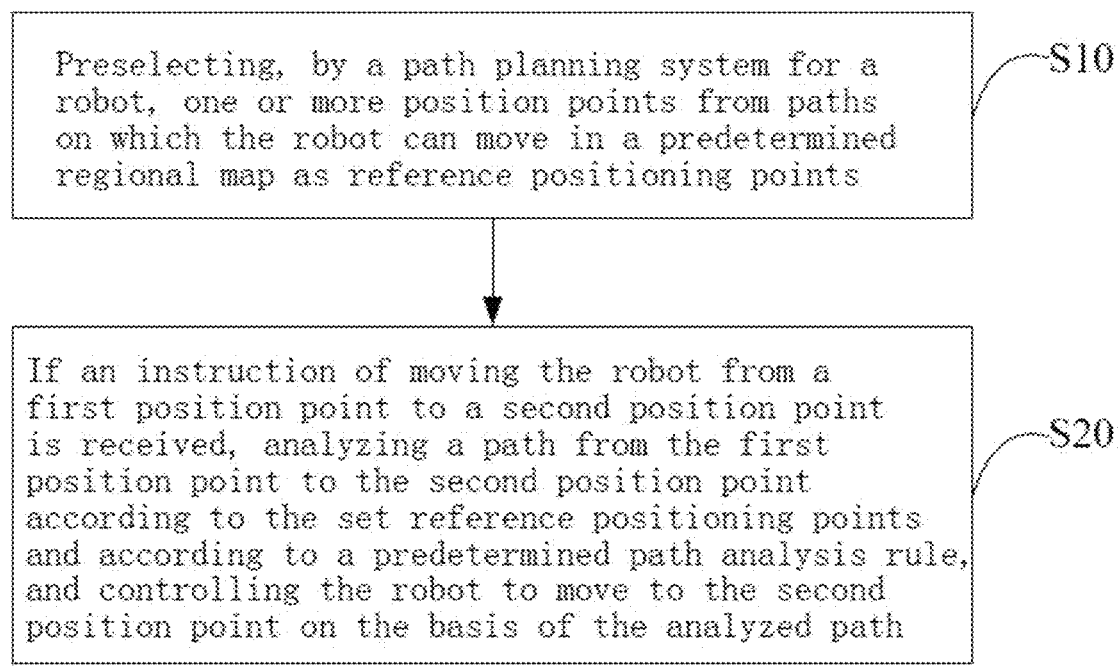
FIG. 2 is a flowchart of an embodiment of a path planning method for a robot according to the disclosure.

Referring to FIG. 2, FIG. 2 is a flowchart of an embodiment of a path planning method for a robot according to the disclosure.

In an embodiment, the path planning method for the robot includes the following steps.

In Step S10, a path planning system for the robot preselects one or more position points from paths on which the robot can move in a predetermined regional map as reference positioning points.

Figure 3:
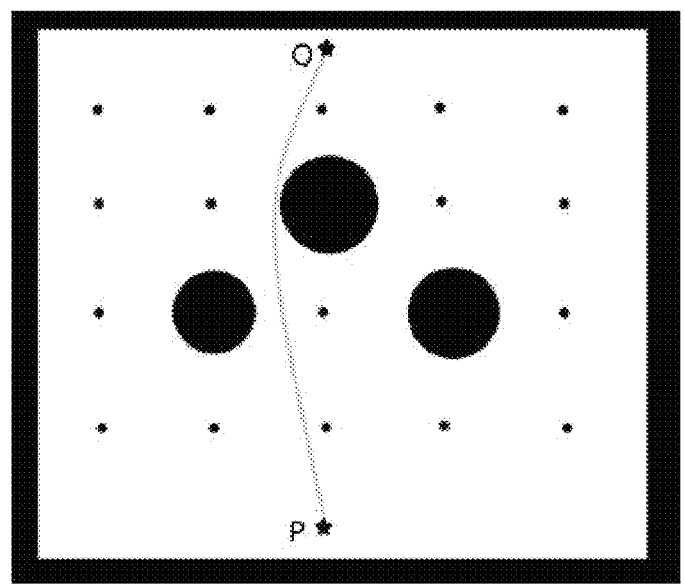
FIG. 3 is a schematic diagram of each reference positioning point selected from a regional map of a public library in an embodiment of a path planning method for a robot according to the disclosure.

In the embodiment, the one or more position points are preselected in the predetermined regional map as the reference positioning points. For example, for a regional map of a public library, one or more position points may be selected from each mutually connected path on which the robot can move as reference positioning points. As shown in FIG. 3, a plurality of smaller black dots in FIG. 3 are each reference positioning point selected in the regional map of the public library, each reference positioning point is positioned on the paths on which the robot can move in the regional map of the public library, and larger black dots in FIG. 3 are obstacles over which the robot cannot pass in the regional map of the public library.

In Step S20, if an instruction of moving the robot from a first position point to a second position point is received, a path from the first position point to the second position point is analyzed according to the set reference positioning points and according to a predetermined path analysis rule, and the robot is controlled to move to the second position point on the basis of the analyzed path.

Figure 4:
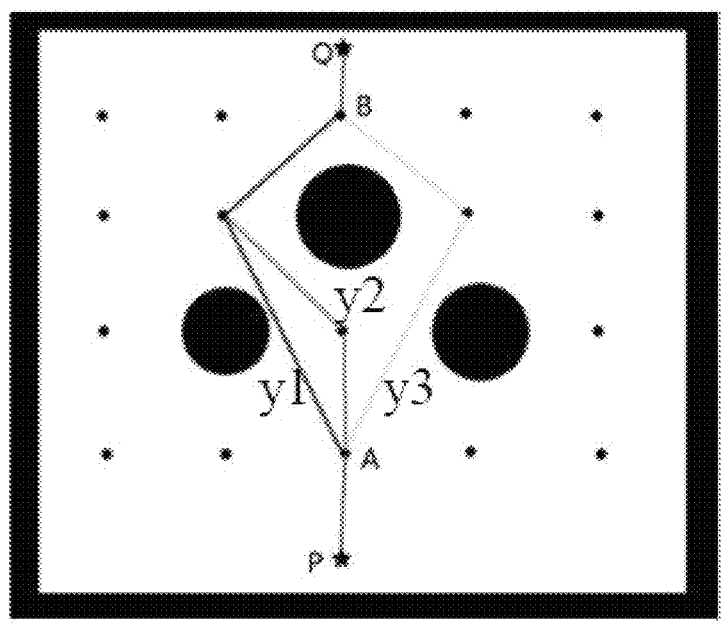
FIG. 4 is a schematic diagram of path planning from a point P to a point Q in a regional map of a public library in an embodiment of a path planning method for a robot according to the disclosure.

If the instruction of moving the robot from the first position point to the second position point is received, that is, the robot is required to move from the first position point (for example, a point P shown in FIG. 3 and FIG. 4) to the second position point (for example, a point Q shown in FIG. 3 and FIG. 4), the path planning system for the robot analyzes the path from the first position point to the second position point according to the set reference positioning points and according to the predetermined path analysis rule, and controls the robot to move to the second position point on the basis of the analyzed path. For example, for each reference positioning point selected in the regional map, multiple movement paths y1, y2 and y3 between different reference positioning points may be predetermined. As shown in FIG. 4, multiple movement paths may be predetermined between a reference positioning point A and a reference positioning point B, and the multiple determined movement paths may avoid the larger black dots, namely avoiding the obstacles over which the robot cannot pass, for the robot to move normally. If the robot can smoothly move from the first position point, for example, the point P, to the reference positioning point A nearby and smoothly move from the second position point, i.e., the point Q, to the reference positioning point B nearby, the path planning system for the robot may select one of the multiple predetermined movement paths between the reference positioning point A and the reference positioning point B as the analyzed movement path of the robot according to a requirement to complete movement of the robot from the first position point to the second position point. For example, if the shortest movement path of the robot is required, the predetermined movement path y1 or y3 between the reference positioning point A and the reference positioning point B may be selected.

According to the embodiment, the one or more position points are preselected from the paths on which the robot can move in the predetermined regional map as the reference positioning points; and after the instruction of moving the robot from the first position point to the second position point is received, the path from the first position point to the second position point is analyzed according to the set reference positioning points and according to the predetermined path analysis rule, and the robot is controlled to move to the second position point on the basis of the analyzed path. The robot is not required to calculate a movement path in real time during path planning, and instead, performs corresponding selection in preplanned paths, that is, a path planning process is converted from "calculation" to "selection", so that a real-time calculation amount is effectively reduced, and path planning efficiency is improved.

Furthermore, the predetermined path analysis rule includes that:

a first reference positioning point (for example, the point A shown in FIG. 4) closest to the first position point and a second reference positioning point (for example, the point B shown in FIG. 4) closest to the second position point are determined;

paths from the first position point to the first reference positioning point and from the second position point to the second reference positioning point are planned according to a first preset planning manner; and a path from the first reference positioning point to the second reference positioning point is planned to obtain a second planned path according to a second preset planning manner.

Wherein, the first planning manner is as follows:

if there is no obstacle between two position points, a straight-line path between the two position points is adopted; and if there is an obstacle between the two position points, a shortest path avoiding the obstacle between the two position points is adopted. Specifically, if there is no obstacle between the first position point and the first reference positioning point, a straight-line path between the first position point and the first reference positioning point, for example, a straight-line path from the point P to the point A, is adopted. If there is no obstacle between the second position point and the second reference positioning point, a straight-line path between the second position point and the second reference positioning point, for example, a straight-line path from the point Q to the point B, is adopted. If there is an obstacle between the first position point and the first reference positioning point, a shortest path avoiding the obstacle between the first position point and the first reference positioning point is adopted; and if there is an obstacle between the second position point and the second reference positioning point, a shortest path avoiding the obstacle between the first position point and the first reference positioning point is adopted.

Furthermore, the second planning manner includes the following steps:

h1: optional planned paths corresponding to the first reference positioning point and the second reference positioning point are determined according to a predetermined mapping relationship between the first reference positioning point, the second reference positioning point and optional planned paths;

h2: a score corresponding to each optional planned path is calculated according to a predetermined scoring rule;

h3: if there is only one optional planned path with the highest score, the optional planned path is determined as the second planned path from the first reference positioning point to the second reference positioning point; and h4: if there are multiple optional planned paths with the highest score, one optional planned path is randomly selected from the multiple optional planned paths with the highest score as the second planned path from the first reference positioning point to the second reference positioning point.

Furthermore, between Steps h1 and h2, the following step is further included:

the optional planned paths are filtered in a predetermined screening manner to screen the optional planned paths to be scored. The predetermined screening manner includes the following steps:

optional planned paths including predetermined specific reference positioning points are screened from each optional planned path and the screened optional planned paths are determined as optional planned paths to be scored. For example, if the robot is required to play an advertisement in a process of moving from the point A to the point B and the advertisement is required to be played on a path M–N on which there are more people, the robot must pass through specific reference positioning points M and N in a path planning process, selectable paths from A to B must include the specific reference positioning points M and N and score calculation is performed only on optional planned paths including the specific reference positioning points M and N to simplify a path selection process.

In another screening manner, a total length corresponding to each optional planned path may also be calculated according to a predetermined calculation formula, and a difference value between the total length of each optional planned path and a total length of the shortest path from the first reference positioning point to the second reference positioning point is calculated. The shortest path from the first reference positioning point to the second reference positioning point may be a straight-line distance between the first reference positioning point and the second reference positioning point, and may also be the shortest path in each optional planned path from the first reference positioning point to the second reference positioning point. The corresponding optional planned paths of which the difference values are smaller than a preset threshold value are screened as the optional planned paths to be scored. That is, the optional planned paths with smaller path lengths are screened for selection, so that efficiency of selecting an optimal planned path is improved.

Furthermore, when the total length corresponding to each optional planned path is calculated according to the predetermined calculation formula, the predetermined calculation formula is:

$$d(\text{path}) = \sum_{i \neq j} d_{ij} x_{ij},$$

where d(path) represents the total length of the path, and further includes:

$$\text{s.t.} \sum_{j=1}^{n} x_{ij} \leq 1 \quad i = 1, 2, \ldots, n$$

$$\text{s.t.} \sum_{i=1}^{n} x_{ij} \leq 1 \quad j = 1, 2, \ldots, n$$

$$\sum_{i,j \in N} x_{ij} \leq n - 1.$$

If it is prescribed that the robot can pass through each reference positioning point in each optional planned path only once, the worst condition is that the robot passes through every reference positioning point. $x_{ij} \in \{0,1\}$, $i,j=1, 2, \ldots, n, i \neq j$ is defined, it is indicated that the robot selects this path if a constraint condition decision variable $x_{ij}=1$ and it is indicated that the robot does not select this path if $x_{ij}=0$.

Furthermore, when the score corresponding to each optional planned path is calculated according to the predetermined scoring rule, the predetermined scoring rule is as follows:

scoring is performed according to a walking distance influence factor, walking time influence factor and/or obstacle influence factor corresponding to each optional planned path, wherein the score of each optional planned path is a total score of paths between every two adjacent nodes in the optional planned path under the walking distance influence factor, the walking time influence factor or the obstacle influence factor.

Figure 5:
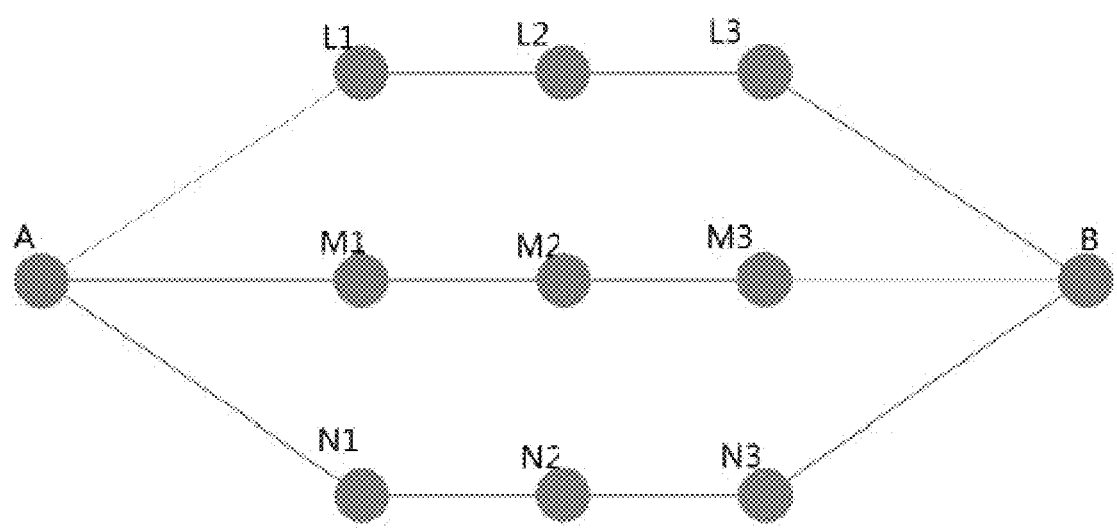
FIG. 5 is a schematic diagram of path planning from a point A to a point B in an embodiment of a path planning method for a robot according to the disclosure.

Specifically, the finally selected path may be defined as:

min[Score(path$_1$),Score(path$_2$), . . . ,Score (path$_i$), . . . ,Score(path$_n$)|n∈N$^+$], where Score(path$_i$) refers to a comprehensive score of the path numbered to be i, and a formula for the comprehensive score of the path is as follows:

Score(path)=g[o(1),o(2), . . . ,o(i), . . . ,o(n)]

where o(i) represents an influence factor, the influence factor includes a walking distance influence factor, a walking time influence factor, an obstacle (for example, obstacle avoiding difficulty) influence factor and the like, and for a certain influence factor, a score value of the influence factor of the whole path is a total score of each segment of path, i.e., $$o(i) = \sum_{k=A}^{B-1} L_{k,k+1},$$

where $L_{k,k+1}$ represents a score of the influence factor of the paths between every two adjacent nodes in the path from A to B. For example, as shown in FIG. 5, if there are three paths for the robot from the point A to the point B, path$_1$=A-L1-L2-L3-B, path$_2$=A-M1-M2-M3-B and path$_3$=A-N1-N2-N3-B, where Li, Ni and Mi (i=1, 2, 3) are reference positioning points, a length of the path path$_1$ is d(path$_1$), a length of the path path$_2$ is d(path$_2$) and a length of the path path$_3$ is d(path$_3$). The score corresponding to each optional planned path is the total score of the paths between every two adjacent nodes in the optional planned score under the walking distance influence factor, the walking time influence factor or the obstacle influence factor. For example, a score corresponding to the path path$_1$ is a total score of paths A-L1, L1-L2, L2-L3 and L3-B between every two adjacent nodes in the optional planned path under the walking distance influence factor, the walking time influence factor or the obstacle influence factor.

Furthermore, a scoring formula for the optional planned path is as follows:

Score(path)=a·o(t)+b·o(d), where o(t) is a time score of the optional planned path, o(d) is a distance score of the optional planned path, and a and b are predetermined weights; and a time score $o_i(t)$ of the i$^{th}$ optional planned path is defined to be:

$$o_i(t) = \frac{T(\text{path}_i)}{\min[T(\text{path}_1), T(\text{path}_2), \ldots, T(\text{path}_n)]} \text{ and}$$

$$T(\text{path}_i) = \Sigma\left(k_{ti} \cdot \frac{d_i}{v_i} \cdot P_i + \frac{d_i}{v_i} \cdot (1-P_i)\right),$$

where T(path$_1$), T(path$_2$) . . . T(path$_n$) are time used for movement of the robot to a target point under different optional planned paths, T(path$_i$) is time used for movement of the robot to the target point under the i$^{th}$ optional planned path, $k_{ti}$ represents a time penalty coefficient of the i$^{th}$ optional planned path, the time penalty coefficient is additional time cost by the robot in passing over an obstacle in the i$^{th}$ optional planned path, $d_i$ represents the path length of the i$^{th}$ optional planned path, $v_i$ represents a velocity of the robot in the i$^{th}$ optional planned path, and $P_i$ represents a probability of appearance of the obstacle in the i$^{th}$ optional planned path.

A distance score $o_i(d)$ of the $i^{th}$ optional planned path is defined to be:

$$o_i(d) = \frac{d(\text{path}_i)}{\min[d(\text{path}_1), d(\text{path}_2), \ldots, d(\text{path}_n)]} \text{ and}$$

$$d(\text{path}_i) = \Sigma(k_{di} \cdot d_i \cdot P_i + d_i \cdot (1 - P_i)),$$

where $d(\text{path}_1)$, $d(\text{path}_2)$ ... $d(\text{path}_n)$ are walking distances for movement of the robot to the target point under different optional planned paths, $k_{di}$ represents a distance penalty coefficient of the $i^{th}$ optional planned path, and the distance penalty coefficient is an additional distance by which the robot is required to move to pass over the obstacle in the $i^{th}$ optional planned path.

In the embodiment, the obstacle influence factor includes an obstacle avoiding difficulty coefficient and a probability of appearance of an obstacle. In an implementation mode, the robot may access an Internet of things system, and more useful information may be obtained through this system. For example: (1) the robot may obtain and process information of an indoor camera through an Internet of things system server. Since a monitoring camera usually corresponds to a certain fixed scenario, data of the camera may be processed by an image processing method to obtain a number and substantial distribution of dynamic obstacles in a certain region. (2) The Internet of things system server may statistically organize flow data of people. Probabilities of concentrated distribution of people in specific time periods and in specific regions may be predicted through the statistical data. (3) Furthermore, the robot system may obtain a distribution of dynamic obstacles in a room (for example, distribution of people) through the indoor camera and refresh probabilities of the obstacles on paths of each segment in real time. Therefore, the robot may dynamically select the optimal path according to an existing condition.

Figure 6:
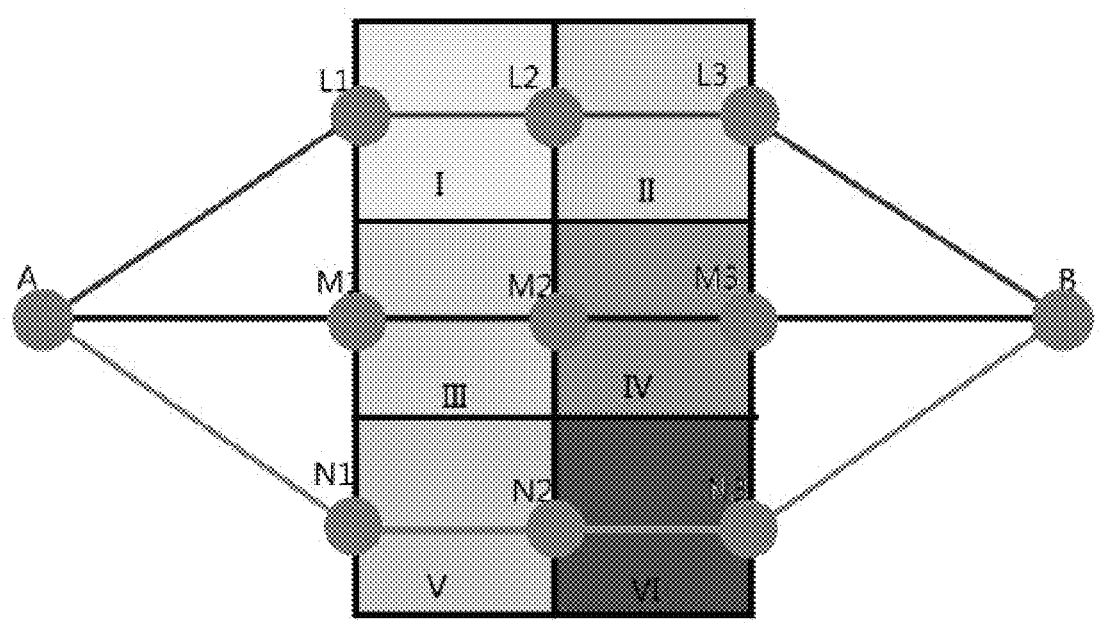
FIG. 6 is a schematic diagram of quantization and calculation of an obstacle influence factor in a practical index in an embodiment of a path planning method for a robot according to the disclosure.

As shown in FIG. 6, FIG. 6 is a schematic diagram of quantization and calculation of an obstacle influence factor in a practical index. A walking path of the robot is divided into a plurality of regions. There is made such a hypothesis that:

(1) a distance d between every two "reference positioning points", (2) a set movement velocity v between every two "reference positioning points" and (3) real-time picture information obtained by the indoor camera, setting data of the server and the like are known, and then an obstacle avoiding difficulty coefficient k and a probability of appearance of obstacles in each region in the present room may be obtained and are mapped to a path planning map of the robot. It may be as well presumed that people are distributed more concentratedly in a region III and a region IV, which makes it more difficult for the robot to avoid the obstacles in the regions, that is, k(III)=k(IV)>k(I)=k(II)=k(V)=k(VI). Distributions of people in regions I and II are similar to regions V and VI. However, historical data shows that obstacles are more likely to appear in the region I and the region II in this time period, that is, P(I)=P(II)>P(V)=P(VI). Correspondingly, the distance penalty coefficient is kd and the time penalty coefficient is kt.

For convenient calculation, differences among paths A-L1, A-M1 and A-N1 and among paths B-L3, B-M3 and B-N3 are ignored, that is, paths L1-L2-L3 (path L), M1-M2-M3 (path M) and N1-N2-N3 (path N) are scored only. Given and known conditions are shown in Table 1:

TABLE 1

| Path | Distance d | Velocity v | Time t | $k_d$ | $k_t$ | P |
|---|---|---|---|---|---|---|
| L1-L2 | 55.0 | 3.0 | 18.3 | 1.5 | 5.0 | 0.8 |
| L2-L3 | 55.0 | 3.0 | 18.3 | 1.5 | 5.0 | 0.8 |
| M1-M2 | 50.0 | 3.0 | 16.7 | 2.0 | 8.0 | 0.6 |
| M2-M3 | 50.0 | 3.0 | 16.7 | 2.0 | 8.0 | 0.6 |
| N1-N2 | 70.0 | 3.0 | 23.3 | 1.5 | 5.0 | 0.3 |
| N2-N3 | 70.0 | 3.0 | 23.3 | 1.5 | 5.0 | 0.3 |

Time and distance scores, corrected by the obstacle factor, of each path may be calculated according to the abovementioned time scoring formula and distance scoring formula, and the comprehensive score of each path may be calculated according to the abovementioned comprehensive scoring formula for the optional planned paths, as shown in Table 2:

TABLE 2

| Path | Corrected distance | Corrected time | o(d) | o(t) | a | b | Comprehensive score |
|---|---|---|---|---|---|---|---|
| L1-L2 | 77.0 | 77.0 | 1.00 | 1.50 | 1.5 | 0.5 | 2.250 |
| L2-L3 | 77.0 | 77.0 | | | | | |
| M1-M2 | 80.0 | 86.7 | 1.04 | 1.69 | 1.5 | 0.5 | 2.403 |
| M2-M3 | 80.0 | 86.7 | | | | | |
| N1-N2 | 80.5 | 51.3 | 1.05 | 1.00 | 1.5 | 0.5 | 2.068 |
| N2-N3 | 80.5 | 51.3 | | | | | |

The path with the lowest score, i.e., a third path, may be analyzed and selected according to a calculation result as the optimal planned movement path of the robot.

Furthermore, the step that the robot is controlled to move to the second position point on the basis of the analyzed path includes that:

the path planning system for the robot analyzes whether there is an obstacle required to be avoided by movement in the present movement path or not in real time or regularly. In an implementation mode, the path planning system for the robot acquires obstacle information in the present movement path from a predetermined region monitoring server (for example, the Internet of things system server) in real time or regularly and analyzes whether there is the obstacle required to be avoided by movement or not according to the acquired obstacle information. For example, if there is a static obstacle on the movement path, it is determined that movement for avoiding is required, or, if a movement path with a dynamic obstacle is intersected with the movement path of the robot, it is determined that movement for avoiding is required. The prior art includes an algorithm for analyzing whether there is the obstacle required to be avoided by movement or not according to the acquired obstacle information and no more elaborations will be made herein. In another implementation mode, the path planning system for the robot detects the obstacle information in the present movement path in real time or regularly through an obstacle detection unit (for example, radar unit) configured in the robot and analyzes whether there is the obstacle required to be avoided by movement or not.

If it is analyzed that there is the obstacle required to be avoided by movement, the path planning system for the robot determines a present position as a new first position point, analyzes a path from the new first position point to the second position point according to the set reference positioning points and according to the predetermined path analysis rule and controls the robot to move to the second position point on the basis of the analyzed path. (For example, the planned path from the point P to the point Q in FIG. 4).

Figure 7:
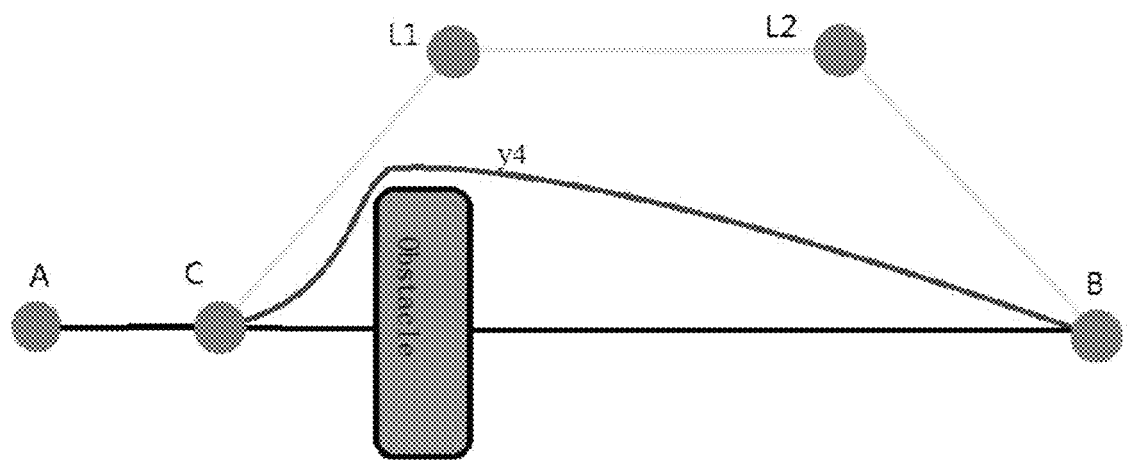
FIG. 7 is a schematic diagram of obstacle avoidance of a robot in an embodiment of a path planning method for a robot according to the disclosure.

As shown in FIG. 7, FIG. 7 is a schematic diagram of obstacle avoidance of the robot. There is made such a hypothesis that the robot plans to move from the point A to the point B and a dynamic obstacle suddenly appears nearby a point C during movement. In the prior art, the robot may dynamically pass over the obstacle according to a certain algorithm and recalculate a new planned path y4 according to a present position. Such a method has some disadvantages. For example:

(1) in a process of passing over the obstacle, the robot is required to keep calculating an avoiding path and keep calculating a path from the present position to the target point, and this process may bring a high consumption in calculation resources and time; and (2) it is impossible for the robot to learn about a size of the obstacle in front of it, time required by passing over it and whether there is another obstacle after this obstacle or not. For example, a long man wall appears in front of the robot and it will cost a lot of time to pass over this man wall by adopting a conventional method.

Relatively, in the manner of planning the path on the basis of the reference positioning points in the embodiment, the robot directly selects another reference positioning point to reselect another path. There is made such a hypothesis that L1 and L2 are reference positioning points. When the robot comes across an obstacle, the robot may reselect another route C-L1-L2-B to reach the point B, that is, the robot may not select to pass over the obstacle but selects another path instead, and moreover, route selection is more efficient than real-time route calculation, may not occupy lots of calculation resources of the robot and may give a response more timely.

Furthermore, at the same time of preselecting the one or more position points in the predetermined regional map as the reference positioning points, the path planning system for the robot also sets a corresponding position point identifier at a position corresponding to each reference positioning point in the predetermined regional map. The position point identifier may be an artificial position sign, e.g., an artificial sign at a position corresponding to a second reference positioning point in a region A3 of a second layer may be "L1A3P2" or "L1A3②". The position point identifier may also be a natural position sign, e.g., a natural sign at the position corresponding to the second reference positioning point in the region A3 of the second layer may be "→A3".

The step that the robot is controlled to move to the second position point on the basis of the analyzed path further includes that:

the path planning system for the robot performs positioning in real time or regularly;

whether the present position is in a triggering coordinate region of a reference positioning point or not is analyzed according to a predetermined mapping relationship between a reference positioning point and a triggering coordinate region, wherein the triggering coordinate region may be a circular region, square region or the like centered on the reference positioning point and with a radius of a preset length;

if the present position is in the triggering coordinate region of the reference positioning point, position point identifier recognition equipment (for example, a camera) is turned on to start to detect the position point identifier; and when the position point identifier is detected, a distance and direction between the robot and the detected position point identifier are calculated through a sensor of the robot to obtain a present position and posture of the robot, and an advancing direction is calibrated according to the present position and posture of the robot.

Furthermore, for greatly reducing a calculation amount for query of each time, the step that whether the present position is in the triggering coordinate region of the reference positioning point or not is analyzed according to the predetermined mapping relationship between the reference positioning point and the triggering coordinate region includes that:

a region which the present position is in is determined according to a predetermined mapping relationship between a region and a coordinate range;

a target reference positioning point corresponding to the present position is determined according to a predetermined mapping relationship between a region and a reference positioning point;

whether the present position is in a triggering coordinate region of the target reference positioning point or not is analyzed; and if the present position is in the triggering coordinate region of the target reference positioning point, it is determined that the present position is in the triggering coordinate region of the reference positioning point, or, if the present position is not in the triggering coordinate region of the target reference positioning point, it is determined that the present position is not in the triggering coordinate region of the reference positioning point.

In the process that the robot moves according to the planned path, the robot is required to determine the present position and a position of the target point in a positioning manner and is also required to confirm its own position in the movement process. A manner of combining relative positioning and absolute positioning is widely adopted at present. Since relative positioning has an inevitable error accumulation problem, an absolute positioning method is required to be adopted for calibration. During relative positioning of the robot, the robot calculates a present positioning result through a relative displacement measured by an inertial sensor and the like on the basis of a previous positioning result. Since a certain error may exist in positioning of each time, the error may be continuously accumulated to be increasingly large and the positioning error may finally be too large to accept after a period of time. Therefore, the robot is required to calibrate positioning information by adopting a certain method at an appropriate moment.

In the embodiment, the position point identifiers are adopted for calibration in a reference positioning point mode, the robot may roughly determine a position of a sign according to its own position, and after recognizing a position point identifier, the robot calculates a distance and direction between the robot and the sign through the sensor to obtain a present position and posture of the robot.

In an existing calibration method, the robot is required to keep the detection equipment on all the time to search for position point identifiers nearby and perform calibration, so that a large number of position point identifiers are required to be arranged in a large range, and lots of calculation resources of the robot are also wasted. While in the embodiment, in the reference positioning point mode, the arrangement range of the position point identifiers is narrowed to be nearby the reference positioning points, global arrangement of a large number of signs is avoided, and signs are selectively arranged nearby the reference positioning points only, so that the number of the arranged signs is effectively reduced, and confusions with other types of identifiers due to arrangement of the large number of signs are prevented.

In an embodiment taking image recognition as a calibration solution, there is made such a hypothesis that a position point identifier of each reference positioning point is a picture and the picture corresponds to a unique coordinate (a,b) in the map. A camera is mounted on the head of the robot to recognize the picture of the position point identifier. When the robot captures the picture of the position point identifier, a relative coordinate (m,n) of the robot relative to a target picture may be obtained, and then the robot may obtain its own present coordinate (a+m, b+n) and determine the coordinate as an accurate present coordinate to implement coordinate calibration. In an implementation mode, for not missing the position point identifier in the movement process, the robot turns on the camera on the head in real time and keeps processing a video. While in another implementation mode, in the reference positioning point mode, when and only when the robot enters a triggering coordinate region, i.e., triggering radius, of a reference positioning point, the camera is turned on to capture the position point identifier for calibration. Therefore, the triggering coordinate region of the reference positioning point is set in the embodiment to provide an opportunity for calibration of the robot and facilitate control of the robot to further reduce the calculation amount and resource consumption.

Figure 8:
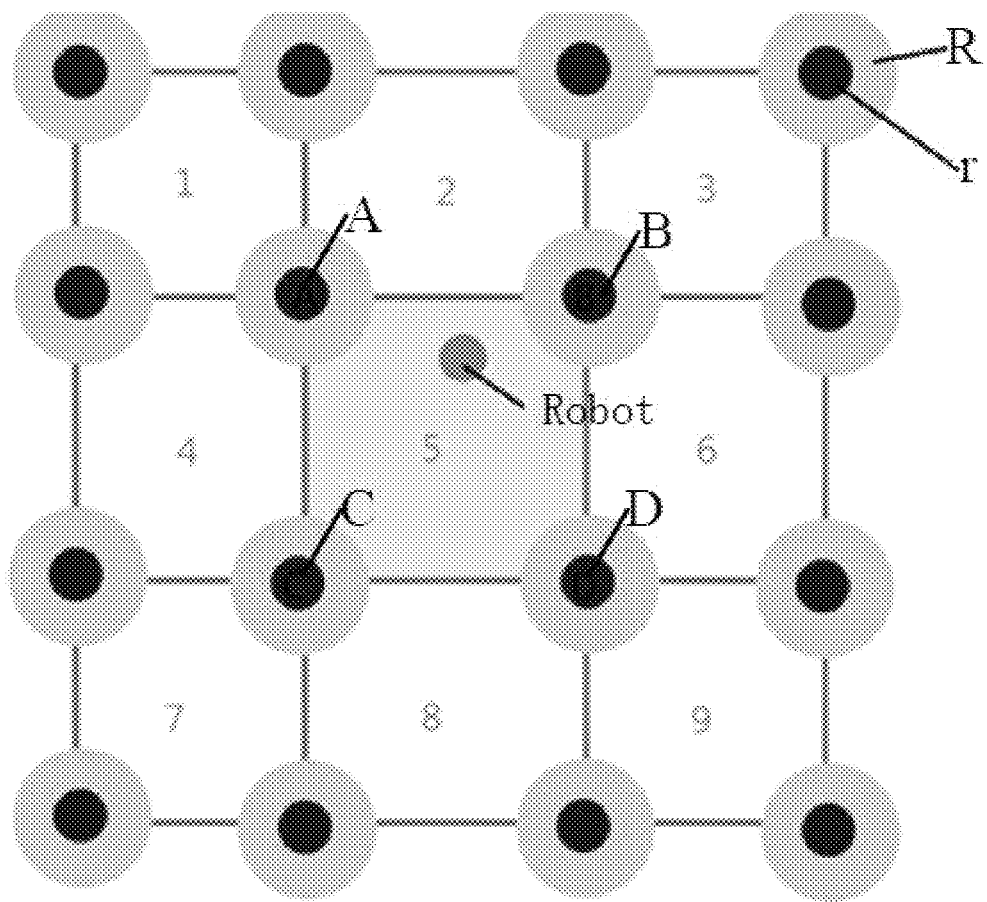
FIG. 8 is a schematic diagram of reference positioning point region division and triggering radius in an embodiment of a path planning method for a robot according to the disclosure.

When whether the present position of the robot is in the triggering coordinate region of a reference positioning point or not is analyzed in the reference positioning point mode, one implementation mode is that the robot uses a present coordinate and a coordinate of each reference positioning point in a database for calibration in real time and judges whether a distance between the present coordinate and the coordinate of a certain reference positioning point is smaller than the triggering radius or not. For accelerating a searching process, in another implementation mode, division and classification are performed on the map and the reference positioning points, and during query, not all of the reference positioning points are queried, and instead, a region where it is positioned is judged and only the reference positioning points forming the region are queried, so that a calculation amount for query of each time is greatly reduced. As shown in FIG. 8, FIG. 8 is a schematic diagram of reference positioning point region division and a triggering radius. The calibration solution includes the following steps.

First, the map is divided into multiple polygonal regions 1, 2 . . . 9 by virtue of reference positioning points r, each reference positioning point having a triggering radius R of a corresponding radius.

Second, the robot judges the specific region where the present coordinate is. For example, the robot is presently positioned in a region numbered to be 5 in FIG. 8.

Third, when the robot is in a certain polygonal region, the robot queries and confirms whether its present coordinate is in the triggering radiuses of the reference positioning points forming angular points of the region or not at a time interval t. For example, in FIG. 8, the present coordinate of the robot is in the square region numbered to be 5, and the robot may only query and confirm whether the present coordinate is in a region of the reference positioning points forming four angular points of the region (i.e., a region formed by four reference positioning points numbered to be A, B, C and D) or not.

Fourth, if it is analyzed that the present coordinate has entered the triggering radius region of a certain reference positioning point, the robot may turn on the position point identifier recognition equipment (for example, the camera) to start to detect the position point identifier.

Fifth, when the position point identifier is detected, the robot may calibrate the present coordinate through calculated coordinate information.

The disclosure further provides a path planning system for a robot.

Figure 9:
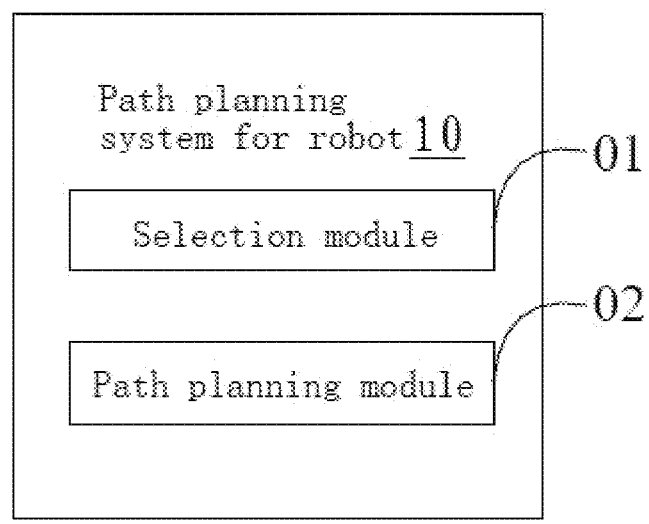
FIG. 9 is a schematic diagram of functional modules in an embodiment of a path planning system for a robot according to the disclosure.

Referring to FIG. 9, a diagram of functional modules of a preferred embodiment of a path planning system 10 for a robot according to the disclosure is shown. In the embodiment, the path planning system 10 for the robot may be divided into one or more modules, and the one or more modules are stored in a memory 11 and executed by one or more processors (a processor 12 in the embodiment) to implement the disclosure. For example, in FIG. 9, the path planning system 10 for the robot may be divided into a selection module 01 and a path planning module 02. The modules mentioned in the disclosure refer to a series of computer program instruction segments capable of realizing specific functions and are more suitable than programs for describing an execution process of the path planning system 10 for the robot in the robot 1. The functions of the selection module 01 and the path planning module 02 will be specifically introduced in the following descriptions.

The selection module 01 is configured to preselect one or more position points from paths on which the robot can move in a predetermined regional map as reference positioning points.

In the embodiment, the one or more position points are preselected in the predetermined regional map as the reference positioning points. For example, for a regional map of a public library, one or more position points may be selected from each mutually connected path on which the robot can move as reference positioning points. As shown in FIG. 3, a plurality of smaller black dots in FIG. 3 are each reference positioning point selected in the regional map of the public library, each reference positioning point is positioned on the paths on which the robot can move in the regional map of the public library, and larger black dots in FIG. 3 are obstacles over which the robot cannot pass in the regional map of the public library.

The path planning module 02 is configured to, if an instruction of moving the robot from a first position point to a second position point is received, analyze a path from the first position point to the second position point according to the set reference positioning points and according to a predetermined path analysis rule and control the robot to move to the second position point on the basis of the analyzed path.

If the instruction of moving the robot from the first position point to the second position point is received, that is, the robot is required to move from the first position point (for example, a point P shown in FIG. 3 and FIG. 4) to the second position point (for example, a point Q shown in FIG. 3 and FIG. 4), the path planning system for the robot analyzes the path from the first position point to the second position point according to the set reference positioning points and according to the predetermined path analysis rule, and controls the robot to move to the second position point on the basis of the analyzed path. For example, for each reference positioning point selected in the regional map, multiple movement paths y1, y2 and y3 between different reference positioning points may be predetermined. As shown in FIG. 4, multiple movement paths may be predetermined between a reference positioning point A and a reference positioning point B, and the multiple determined movement paths may avoid the larger black dots, namely avoiding the obstacles over which the robot cannot pass, to allow the robot to move normally. If the robot can smoothly move from the first position point, for example, the point P, to the reference positioning point A nearby and smoothly move from the second position point, i.e., the point Q, to the reference positioning point B nearby, the path planning system for the robot may select one of the multiple predetermined movement paths between the reference positioning point A and the reference positioning point B as the analyzed movement path of the robot according to a requirement to complete movement of the robot from the first position point to the second position point. For example, if the shortest movement path of the robot is required, the predetermined movement path y1 or y3 between the reference positioning point A and the reference positioning point B may be selected.

According to the embodiment, the one or more position points are preselected from the paths on which the robot can move in the predetermined regional map as the reference positioning points; and after the instruction of moving the robot from the first position point to the second position point is received, the path from the first position point to the second position point is analyzed according to the set reference positioning points and according to the predetermined path analysis rule, and the robot is controlled to move to the second position point on the basis of the analyzed path. The robot is not required to calculate a movement path in real time during path planning, and instead, performs corresponding selection in preplanned paths, that is, a path planning process is converted from "calculation" to "selection", so that a real-time calculation amount is effectively reduced, and path planning efficiency is improved.

Furthermore, the predetermined path analysis rule includes that:

a first reference positioning point (for example, the point A shown in FIG. 4) closest to the first position point and a second reference positioning point (for example, the point B shown in FIG. 4) closest to the second position point are determined;

paths from the first position point to the first reference positioning point and from the second position point to the second reference positioning point are planned according to a first preset planning manner; and a path from the first reference positioning point to the second reference positioning point is planned to obtain a second planned path according to a second preset planning manner.

Wherein, the first planning manner is as follows:

if there is no obstacle between two position points, a straight-line path between the two position points is adopted; and if there is an obstacle between the two position points, a shortest path avoiding the obstacle between the two position points is adopted. Specifically, if there is no obstacle between the first position point and the first reference positioning point, a straight-line path between the first position point and the first reference positioning point, for example, a straight-line path from the point P to the point A, is adopted. If there is no obstacle between the second position point and the second reference positioning point, a straight-line path between the second position point and the second reference positioning point, for example, a straight-line path from the point Q to the point B, is adopted. If there is an obstacle between the first position point and the first reference positioning point, a shortest path avoiding the obstacle between the first position point and the first reference positioning point is adopted; and if there is an obstacle between the second position point and the second reference positioning point, a shortest path avoiding the obstacle between the first position point and the first reference positioning point is adopted.

Furthermore, the second planning manner includes the following steps:

h1: optional planned paths corresponding to the first reference positioning point and the second reference positioning point are determined according to a predetermined mapping relationship between the first reference positioning point, the second reference positioning point and optional planned paths;

h2: a score corresponding to each optional planned path is calculated according to a predetermined scoring rule;

h3: if there is only one optional planned path with the highest score, the optional planned path is determined as the second planned path from the first reference positioning point to the second reference positioning point; and h4: if there are multiple optional planned paths with the highest score, one optional planned path is randomly selected from the multiple optional planned paths with the highest score as the second planned path from the first reference positioning point to the second reference positioning point.

Furthermore, between Steps h1 and h2, the following step is further included:

the optional planned paths are filtered in a predetermined screening manner to screen the optional planned paths to be scored. The predetermined screening manner includes the following steps:

optional planned paths including predetermined specific reference positioning points are screened from each optional planned path and the screened optional planned paths are taken as optional planned paths to be scored. For example, if the robot is required to play an advertisement in a process of moving from the point A to the point B and the advertisement is required to be played on a path M-N on which there are more people, the robot must pass through specific reference positioning points M and N in a path planning process, selectable paths from A to B must include the specific reference positioning points M and N and score calculation is performed only on optional planned paths including the specific reference positioning points M and N to simplify a path selection process.

In another screening manner, a total length corresponding to each optional planned path may also be calculated according to a predetermined calculation formula, and a difference value between the total length of each optional planned path and a total length of the shortest path from the first reference positioning point to the second reference positioning point is calculated. The shortest path from the first reference positioning point to the second reference positioning point may be a straight-line distance between the first reference positioning point and the second reference positioning point, and may also be the shortest path in each optional planned path from the first reference positioning point to the second reference positioning point. The corresponding optional planned paths of which the difference values are smaller than a preset threshold value are screened as the optional planned paths to be scored. That is, the optional planned paths with smaller path lengths are screened for selection, so that efficiency of selecting an optimal planned path is improved.

Furthermore, when the total length corresponding to each optional planned path is calculated according to the predetermined calculation formula, the predetermined calculation formula is:

$$d(\text{path}) = \sum_{i \neq j} d_{ij} x_{ij},$$

where d(path) represents the total length of the path, and further includes:

$$\text{s.t.} \sum_{j=1}^{n} x_{ij} \leq 1 \quad i = 1, 2, \ldots, n$$

$$\text{s.t.} \sum_{i=1}^{n} x_{ij} \leq 1 \quad j = 1, 2, \ldots, n$$

$$\sum_{i,j \in N} x_{ij} \leq n - 1.$$

If it is prescribed that the robot can pass through each reference positioning point in each optional planned path only once, the worst condition is that the robot passes through every reference positioning point. $x_{ij} \in \{0,1\}$, i,j=1, 2, ..., n, i≠j is defined, it is indicated that the robot selects this path if a constraint condition decision variable $x_{ij}=1$ and it is indicated that the robot does not select this path if $x_{ij}=0$.

Furthermore, when the score corresponding to each optional planned path is calculated according to the predetermined scoring rule, the predetermined scoring rule is as follows:

scoring is performed according to a walking distance influence factor, walking time influence factor and/or obstacle influence factor corresponding to each optional planned path, wherein the score of each optional planned path is a total score of paths between every two adjacent nodes in the optional planned path under the walking distance influence factor, the walking time influence factor or the obstacle influence factor.

Specifically, the finally selected path may be defined as:

min[Score(path$_1$),Score(path$_2$), . . . ,Score(path$_i$), . . . ,Score(path$_n$)|n∈N$^+$], where Score(path$_i$) refers to a comprehensive score of the path numbered to be i, and a formula for the comprehensive score of the path is as follows:

Score(path)=g[o(1),o(2), . . . ,o(i), . . . ,o(n)], where o(i) represents an influence factor, the influence factor includes a walking distance influence factor, a walking time influence factor, an obstacle (for example, obstacle avoiding difficulty) influence factor and the like, and for a certain influence factor, a score value of the influence factor of the whole path is a total score of each segment of path, i.e., $$o(i) = \sum_{k=A}^{B-1} L_{k,k+1},$$

where $L_{k,k+1}$ represents a score of the influence factor of the paths between every two adjacent nodes in the path from A to B. For example, as shown in FIG. 5, if there are three paths for the robot from the point A to the point B, path$_1$=A-L1-L2-L3-B, path$_2$=A-M1-M2-M3-B and path$_3$=A-N1-N2-N3-B, where Li, Ni and Mi (i=1, 2, 3) are reference positioning points, a length of the path path$_1$ is d(path$_1$), a length of the path path$_2$ is d(path$_2$) and a length of the path path$_3$ is d(path$_3$). The score corresponding to each optional planned path is the total score of the paths between every two adjacent nodes in the optional planned score under the walking distance influence factor, the walking time influence factor or the obstacle influence factor. For example, a score corresponding to the path path$_1$ is a total score of paths A-L1, L1-L2, L2-L3 and L3-B between every two adjacent nodes in the optional planned path under the walking distance influence factor, the walking time influence factor or the obstacle influence factor.

Furthermore, a scoring formula for the optional planned path is as follows:

Score(path)=a·o(t)+b·o(d)

where o(t) is a time score of the optional planned path, o(d) is a distance score of the optional planned path, and a and b are predetermined weights; and a time score $o_i(t)$ of the i$^{th}$ optional planned path is defined to be:

$$o_i(t) = \frac{T(\text{path}_i)}{\min[T(\text{path}_1), T(\text{path}_2), \ldots, T(\text{path}_n)]} \text{ and}$$

$$T(\text{path}_i) = \Sigma\left(k_{ti} \cdot \frac{d_i}{v_i} \cdot P_i + \frac{d_i}{v_i} \cdot (1 - P_i)\right),$$

where T(path$_1$), T(path$_2$) . . . T(path$_n$) are time used for movement of the robot to a target point under different optional planned paths, T(path$_i$) is time used for movement of the robot to the target point under the i$^{th}$ optional planned path, $k_{ti}$ represents a time penalty coefficient of the i$^{th}$ optional planned path, the time penalty coefficient is additional time cost by the robot in passing over an obstacle in the i$^{th}$ optional planned path, $d_i$ represents the path length of the i$^{th}$ optional planned path, $v_i$ represents a velocity of the robot in the i$^{th}$ optional planned path, and $P_i$ represents a probability of appearance of the obstacle in the i$^{th}$ optional planned path.

A distance score $o_i(d)$ of the i$^{th}$ optional planned path is defined to be:

$$o_i(d) = \frac{d(\text{path}_i)}{\min[d(\text{path}_1), d(\text{path}_2), \ldots, d(\text{path}_n)]} \text{ and}$$

$$d(\text{path}_i) = \Sigma(k_{di} \cdot d_i \cdot P_i + d_i \cdot (1 - P_i)),$$

where d(path$_1$), d(path$_2$) . . . d(path$_n$) are walking distances for movement of the robot to the target point under different optional planned paths, $k_{di}$ represents a distance penalty coefficient of the i$^{th}$ optional planned path, and the distance penalty coefficient is an additional distance by which the robot is required to move to pass over the obstacle in the i$^{th}$ optional planned path.

In the embodiment, the obstacle influence factor includes an obstacle avoiding difficulty coefficient and a probability of appearance of an obstacle. In an implementation mode, the robot may access an Internet of things system, and more useful information may be obtained through this system. For example: (1) the robot may obtain and process information of an indoor camera through an Internet of things system server. Since a monitoring camera usually corresponds to a certain fixed scenario, data of the camera may be processed by an image processing method to obtain a number and substantial distribution of dynamic obstacles in a certain region. (2) The Internet of things system server may statistically organize flow data of people. Probabilities of concentrated distribution of people in specific time periods and in specific regions may be predicted through the statistical data. (3) Furthermore, the robot system may obtain a distribution of dynamic obstacles in a room (for example, distribution of people) through the indoor camera and refresh probabilities of the obstacles on paths of each segment in real time. Therefore, the robot may dynamically select the optimal path according to an existing condition.

As shown in FIG. 6, FIG. 6 is a schematic diagram of quantization and calculation of an obstacle influence factor in a practical index. A walking path of the robot is divided into a plurality of regions. There is made such a hypothesis that:

(1) a distance d between every two "reference positioning points", (2) a set movement velocity v between every two "reference positioning points" and (3) real-time picture information obtained by the indoor camera, setting data of the server and the like are known, and then an obstacle avoiding difficulty coefficient k and a probability of appearance of obstacles in each region in the present room may be obtained and are mapped to a path planning map of the robot. It may be as well presumed that people are distributed more concentratedly in a region III and a region IV, which makes it more difficult for the robot to avoid the obstacles in the regions, that is, k(III)=k(IV)>k(I)=k(II)=k(V)=k(VI). Distributions of people in regions I and II are similar to that in regions V and VI. However, historical data shows that obstacles are more likely to appear in the region I and the region II in this time period, that is, P(I)=P(II)>P(V)=P(VI). Correspondingly, the distance penalty coefficient is kd and the time penalty coefficient is kt.

For convenient calculation, differences among paths A-L1, A-M1 and A-N1 and among paths B-L3, B-M3 and B-N3 are ignored, that is, paths L1-L2-L3 (path L), M1-M2-M3 (path M) and N1-N2-N3 (path N) are scored only. Given and known conditions are shown in Table 1:

TABLE 1

| Path | Distance d | Velocity v | Time t | $k_d$ | $k_t$ | P |
|---|---|---|---|---|---|---|
| L1-L2 | 55.0 | 3.0 | 18.3 | 1.5 | 5.0 | 0.8 |
| L2-L3 | 55.0 | 3.0 | 18.3 | 1.5 | 5.0 | 0.8 |
| M1-M2 | 50.0 | 3.0 | 16.7 | 2.0 | 8.0 | 0.6 |
| M2-M3 | 50.0 | 3.0 | 16.7 | 2.0 | 8.0 | 0.6 |
| N1-N2 | 70.0 | 3.0 | 23.3 | 1.5 | 5.0 | 0.3 |
| N2-N3 | 70.0 | 3.0 | 23.3 | 1.5 | 5.0 | 0.3 |

Time and distance scores, corrected by the obstacle factor, of each path may be calculated according to the abovementioned time scoring formula and distance scoring formula, and the comprehensive score of each path may be calculated according to the abovementioned comprehensive scoring formula for the optional planned paths, as shown in Table 2:

TABLE 2

| Path | Corrected distance | Corrected time | o(d) | o(t) | a | b | Comprehensive score |
|---|---|---|---|---|---|---|---|
| L1-L2 | 77.0 | 77.0 | 1.00 | 1.50 | 1.5 | 0.5 | 2.250 |
| L2-L3 | 77.0 | 77.0 | | | | | |
| M1-M2 | 80.0 | 86.7 | 1.04 | 1.69 | 1.5 | 0.5 | 2.403 |
| M2-M3 | 80.0 | 86.7 | | | | | |
| N1-N2 | 80.5 | 51.3 | 1.05 | 1.00 | 1.5 | 0.5 | 2.068 |
| N2-N3 | 80.5 | 51.3 | | | | | |

The path with the lowest score, i.e., a third path, may be analyzed and selected according to a calculation result as the optimal planned movement path of the robot.

Furthermore, the path planning module 02 is further configured to:

analyze whether there is an obstacle required to be avoided by movement in the present movement path or not in real time or regularly. In an implementation mode, the path planning system for the robot acquires obstacle information in the present movement path from a predetermined region monitoring server (for example, the Internet of things system server) in real time or regularly and analyzes whether there is the obstacle required to be avoided by movement or not according to the acquired obstacle information. For example, if there is a static obstacle on the movement path, it is determined that movement for avoiding is required, or, if a movement path with a dynamic obstacle is intersected with the movement path of the robot, it is determined that movement for avoiding is required. The prior art includes an algorithm for analyzing whether there is the obstacle required to be avoided by movement or not according to the acquired obstacle information and no more elaborations will be made herein. In another implementation mode, the path planning system for the robot detects the obstacle information in the present movement path in real time or regularly through an obstacle detection unit (for example, radar unit) configured in the robot and analyzes whether there is the obstacle required to be avoided by movement or not.

If it is analyzed that there is the obstacle required to be avoided by movement, the path planning system for the robot determines a present position as a new first position point, analyzes a path from the new first position point to the second position point according to the set reference positioning points and according to the predetermined path analysis rule and controls the robot to move to the second position point on the basis of the analyzed path. (For example, the planned path from the point P to the point Q in FIG. 4).

As shown in FIG. 7, FIG. 7 is a schematic diagram of obstacle avoidance of the robot. There is made such a hypothesis that the robot plans to move from the point A to the point B and a dynamic obstacle suddenly appears nearby a point C during movement. In the prior art, the robot may dynamically pass over the obstacle according to a certain algorithm and recalculate a new planned path y4 according to a present position. Such a method has some disadvantages. For example:

(1) in a process of passing over the obstacle, the robot is required to keep calculating an avoiding path and keep calculating a path from the present position to the target point, and this process may bring a high consumption in calculation resources and time; and (2) it is impossible for the robot to learn about a size of the obstacle in front of it, time required by passing over it and whether there is another obstacle after this obstacle or not. For example, a long man wall appears in front of the robot and it will cost a lot of time to pass over this man wall by adopting a conventional method.

Relatively, in the manner of planning the path on the basis of the reference positioning points in the embodiment, the robot directly selects another reference positioning point to reselect another path. There is made such a hypothesis that L1 and L2 are reference positioning points. When the robot comes across an obstacle, the robot may reselect another route C-L1-L2-B to reach the point B, that is, the robot may not select to pass over the obstacle but selects another path instead, and moreover, route selection is more efficient than real-time route calculation, may not occupy lots of calculation resources of the robot and may give a response more timely.

Furthermore, at the same time of preselecting the one or more position points in the predetermined regional map as the reference positioning points, the selection module 01 also sets a corresponding position point identifier at a position corresponding to each reference positioning point in the predetermined regional map. The position point identifier may be an artificial position sign, e.g., an artificial sign at a position corresponding to a second reference positioning point in a region A3 of a second layer may be "L1A3P2" or "L1A3②". The position point identifier may also be a natural position sign, e.g., a natural sign at the position corresponding to the second reference positioning point in the region A3 of the second layer may be "→A3".

The path planning module 02 is further configured to:

perform positioning in real time or regularly; analyze whether the present position is in a triggering coordinate region of a reference positioning point or not according to a predetermined mapping relationship between a reference positioning point and a triggering coordinate region, wherein the triggering coordinate region may be a circular region, square region or the like centered on the reference positioning point and with a radius of a preset length;

if the present position is in the triggering coordinate region of the reference positioning point, turn on position point identifier recognition equipment (for example, a camera) to start to detect the position point identifier; and when the position point identifier is detected, calculate a distance and direction between the robot and the detected position point identifier through a sensor of the robot to obtain a present position and posture of the robot and calibrate an advancing direction according to the present position and posture of the robot.

Furthermore, for greatly reducing a calculation amount for query of each time, the path planning module 02 is further configured to:

determine a region which the present position is in according to a predetermined mapping relationship between a region and a coordinate range;

determine a target reference positioning point corresponding to the present position according to a predetermined mapping relationship between a region and a reference positioning point; analyze whether the present position is in a triggering coordinate region of the target reference positioning point or not; and if the present position is in the triggering coordinate region of the target reference positioning point, determine that the present position is in the triggering coordinate region of the reference positioning point, or, if the present position is not in the triggering coordinate region of the target reference positioning point, determine that the present position is not in the triggering coordinate region of the reference positioning point.

In the process that the robot moves according to the planned path, the robot is required to determine the present position and a position of the target point in a positioning manner and is also required to confirm its own position in the movement process. A manner of combining relative positioning and absolute positioning is widely adopted at present. Since relative positioning has an inevitable error accumulation problem, an absolute positioning method is required to be adopted for calibration. During relative positioning of the robot, the robot calculates a present positioning result through a relative displacement measured by an inertial sensor and the like on the basis of a previous positioning result. Since a certain error may exist in positioning of each time, the error may be continuously accumulated to be increasingly large and the positioning error may finally be too large to accept after a period of time. Therefore, the robot is required to calibrate positioning information by adopting a certain method at an appropriate moment.

In the embodiment, the position point identifiers are adopted for calibration in a reference positioning point mode, the robot may roughly determine a position of a sign according to its own position, and after recognizing a position point identifier, the robot calculates a distance and direction between the robot and the sign through the sensor to obtain a present position and posture of the robot.

In an existing calibration method, the robot is required to keep the detection equipment on all the time to search for position point identifiers nearby and perform calibration, so that a large number of position point identifiers are required to be arranged in a large range, and lots of calculation resources of the robot are also wasted. While in the embodiment, in the reference positioning point mode, the arrangement range of the position point identifiers is narrowed to be nearby the reference positioning points, global arrangement of a large number of signs is avoided, and signs are selectively arranged nearby the reference positioning points only, so that the number of the arranged signs is effectively reduced, and confusions with other types of identifiers due to arrangement of the large number of signs are prevented.

In an embodiment taking image recognition as a calibration solution, there is made such a hypothesis that a position point identifier of each reference positioning point is a picture and the picture corresponds to a unique coordinate (a,b) in the map. A camera is mounted on the head of the robot to recognize the picture of the position point identifier. When the robot captures the picture of the position point identifier, a relative coordinate (m,n) of the robot relative to a target picture may be obtained, and then the robot may obtain its own present coordinate (a+m, b+n) and determine the coordinate as an accurate present coordinate to implement coordinate calibration. In an implementation mode, for not missing the position point identifier in the movement process, the robot turns on the camera on the head in real time and keeps processing a video. While in another implementation mode, in the reference positioning point mode, when and only when the robot enters a triggering coordinate region, i.e., triggering radius, of a reference positioning point, the camera is turned on to capture the position point identifier for calibration. Therefore, the triggering coordinate region of the reference positioning point is set in the embodiment to provide an opportunity for calibration of the robot and facilitate control of the robot to further reduce the calculation amount and resource consumption.

When whether the present position of the robot is in the triggering coordinate region of a reference positioning point or not is analyzed in the reference positioning point mode, one implementation mode is that the robot uses a present coordinate and a coordinate of each reference positioning point in a database for calibration in real time and judges whether a distance between the present coordinate and the coordinate of a certain reference positioning point is smaller than the triggering radius or not. For accelerating a searching process, in another implementation mode, division and classification are performed on the map and the reference positioning points, and during query, not all of the reference positioning points are queried, and instead, a region where it is positioned is judged and only the reference positioning points forming the region are queried, so that a calculation amount for query of each time is greatly reduced. As shown in FIG. 8, FIG. 8 is a schematic diagram of reference positioning point region division and a triggering radius. The calibration solution includes the following steps.

First, the map is divided into multiple polygonal regions 1, 2 . . . 9 by virtue of reference positioning points r, each reference positioning point having a triggering radius R of a corresponding radius.

Second, the robot judges the specific region where the present coordinate is. For example, the robot is presently positioned in a region numbered to be 5 in FIG. 8.

Third, when the robot is in a certain polygonal region, the robot queries and confirms whether its present coordinate is in the triggering radiuses of the reference positioning points forming angular points of the region or not at a time interval t. For example, in FIG. 8, the present coordinate of the robot is in the square region numbered to be 5, and the robot may only query and confirm whether the present coordinate is in a region of the reference positioning points forming four angular points of the region (i.e., a region formed by four reference positioning points numbered to be A, B, C and D) or not.

Fourth, if it is analyzed that the present coordinate has entered the triggering radius region of a certain reference positioning point, the robot may turn on the position point identifier recognition equipment (for example, the camera) to start to detect the position point identifier.

Fifth, when the position point identifier is detected, the robot may calibrate the present coordinate through calculated coordinate information.

It is important to note that, in the disclosure, terms "include", "contain" or any other variant thereof is intended to cover nonexclusive inclusions, thereby making a process, method, article or device including a series of elements not only include those elements but also include other elements which are not explicitly listed or further include elements intrinsic to this process, method, article or device. Under the condition of no more restrictions, an element defined by a statement "including a/an . . . " does not exclude existence of the same other element in a process, method, article or device including the element.

By the description of the foregoing implementation modes, it will be evident to those skilled in the art that the methods according to the above embodiments can be implemented by means of software plus the necessary general-purpose hardware platform; and they can of course be implemented by hardware, but in many cases the former will be more advantageous. Based on such an understanding, the essential technical solution of the disclosure, or the portion that contributes to the prior art may be embodied as software products. Computer software products can be stored in a storage medium (e.g., a Read-Only Memory (ROM)/Random Access Memory (RAM), a magnetic disk and an optical disc) and may include multiple instructions that, when executed, can cause a piece of terminal equipment (e.g., a mobile phone, a computer, a server or network equipment) to execute the methods described in the various embodiments of the disclosure.

The foregoing description merely depicts the preferred embodiments of the disclosure and is not thus intended to limit the patentable scope of the disclosure. Sequence numbers of the embodiments of the disclosure are adopted not to represent quality of the embodiments but only for description. In addition, although logic sequences are shown in the flowcharts, the shown or described steps may be executed in sequences different from those shown herein under some conditions.

Those skilled in the art may implement the disclosure with multiple transformed solutions without departing from the scope and essence of the disclosure. For example, a characteristic taken as an embodiment may be adopted for another embodiment to obtain a third embodiment. Any modifications, equivalent replacements and improvements made within the technical concept of the disclosure shall fall within the scope of the disclosure.

What is claimed is:

1. A path planning system for a robot, operated in the robot, the path planning system comprising at least one computer-readable instruction, the at least one computer-readable instruction being executed by a processing equipment of the robot to implement the following operations:

preselecting one or more position points from paths on which the robot moves in a predetermined regional map as reference positioning points; and if an instruction of moving the robot from a first position point to a second position point is received, analyzing a path from the first position point to the second position point according to the set reference positioning points and a predetermined path analysis rule, and controlling the robot to move to the second position point on the basis of the analyzed path, wherein the predetermined path analysis rule comprises: determining a first reference positioning point closest to the first position point and a second reference positioning point closest to the second position point; planning first paths from the first position point to the first reference positioning point and from the second position point to the second reference positioning point according to a first preset planning manner; and planning a second path from the first reference positioning point to the second reference positioning point to obtain a second planned path according to a second preset planning manner;

wherein the second planning manner comprises the following steps: h1: determining optional planned paths corresponding to the first reference positioning point and the second reference positioning point according to a predetermined mapping relationship between the first reference positioning point, the second reference positioning point and the optional planned paths; h2: calculating a score corresponding to each optional planned path according to a predetermined scoring rule; h3: if there is only one optional planned path with a highest score, determining the optional planned path as the second planned path from the first reference positioning point to the second reference positioning point; and h4: if there are multiple optional planned paths with the highest score, randomly selecting one optional planned path from the multiple optional planned paths with the highest score as the second planned path from the first reference positioning point to the second reference positioning point;

wherein the step h2 comprises: performing scoring according to a walking distance influence factor, a walking time influence factor and/or an obstacle influence factor corresponding to each optional planned path, wherein the score corresponding to each optional planned path is a total score of paths between every two adjacent nodes in the optional planned path under the walking distance influence factor, the walking time influence factor or the obstacle influence factor;

wherein a scoring formula for the optional planned path is as follows:

$$\text{Score(path)} = a \cdot o(t) + b \cdot o(d)$$

where o(t) is a time score of the optional planned path, o(d) is a distance score of the optional planned path, and a and b are predetermined weights; a time score $o_i(t)$ of the $i^{th}$ optional planned path is defined to be:

$$o_i(t) = \frac{T(\text{path}_i)}{\min[T(\text{path}_1), T(\text{path}_2), \ldots, T(\text{path}_n)]}, \text{ and}$$

$$T(\text{path}_i) = \Sigma\left(k_{ti} \cdot \frac{d_i}{v_i} \cdot P_i + \frac{d_i}{v_i} \cdot (1 - P_i)\right),$$

where $T(\text{path}_1)$ $T(\text{path}_2)$ ... $T(\text{path}_n)$ are time used for a movement of ath) the robot to a target point under the different optional planned paths, $T(\text{path}_i)$ is time used for the movement of the robot to the target point under the $i^{th}$ optional planned path, $k_{ti}$ represents a time penalty coefficient of the $i^{th}$ optional planned path, the time penalty coefficient is an additional time cost by the robot in passing over an obstacle in the $i^{th}$ optional planned path, $d_i$ represents a path length of the $i^{th}$ optional planned path, $v_i$ represents a velocity of the robot in the $i^{th}$ optional planned path, and $P_i$ represents a probability of an appearance of the obstacle in the $i^{th}$ optional planned path; and a distance score $o_i(d)$ of the $i^{th}$ optional planned path is defined to be:

$$o_i(d) = \frac{d(\text{path}_i)}{\min[d(\text{path}_1), d(\text{path}_2), \ldots, d(\text{path}_n)]}, \text{ and}$$

$$d(\text{path}_i) = \Sigma(k_{di} \cdot d_i \cdot P_i + d_i \cdot (1 - P_i)),$$

where $d(\text{path}_1)$ $d(\text{path}_2)$ ... $d(\text{path}_n)$ are walking distances for the movement of the robot to the target point under the different optional planned paths, $k_{di}$ represents a distance penalty coefficient of the $i^{th}$ optional planned path, and the distance penalty coefficient is an additional distance by which the robot is required to move to pass over the obstacle in the $i^{th}$ optional planned path.

2. The path planning system of claim 1, wherein the first planning manner comprises:
if there is no obstacle between the first position point and the first reference positioning point, adopting a straight-line path between the first position point and the first reference positioning point; if there is no obstacle between the second position point and the second reference positioning point, adopting the straight-line path between the second position point and the second reference positioning point;
if there is a first obstacle between the first position point and the first reference positioning point, adopting a shortest path avoiding the first obstacle between the first position point and the first reference positioning point; and if there is a second obstacle between the second position point and the second reference positioning point, adopting the shortest path avoiding the second obstacle between the second position point and the second reference positioning point.

3. The path planning system of claim 1, wherein, between the step h1 and the step h2, the following steps are further comprised:
screening optional planned paths comprising predetermined specific reference positioning points from each optional planned path, and determining the screened optional planned paths as optional planned paths to be scored; and/or,
calculating a total length corresponding to each optional planned path according to a predetermined calculation formula, calculating a difference value between the total length of each optional planned path and a total length of the shortest path from the first reference positioning point to the second reference positioning point, and screening the optional planned paths of which the difference values are smaller than a preset threshold value as the optional planned paths to be scored.

4. The path planning system of claim 1, wherein the at least one computer-readable instruction is further executed by the processing equipment to implement the following operations:
analyzing whether there is an obstacle required to be avoided by a movement in the present movement path or not in real time; and if it is analyzed that there is the obstacle required to be avoided by the movement, determining a present position as a new first position point, analyzing a path from the new first position point to the second position point according to the set reference positioning points and the predetermined path analysis rule, and controlling the robot to move to the second position point on the basis of the analyzed path.

5. The path planning system of claim 1, wherein the at least one computer-readable instruction is further executed by the processing equipment to implement the following operations:
setting a corresponding position point identifier at a position corresponding to each reference positioning point in the predetermined regional map; and
performing positioning in real time, analyzing whether the present position is in a triggering coordinate region of a reference positioning point or not according to a predetermined mapping relationship between a reference positioning point and a triggering coordinate region, if the present position is in the triggering coordinate region of the reference positioning point, turning on aposition point identifier recognition equipment to start to detect the position point identifier, and when the position point identifier is detected, calculating a distance and direction between the robot and the detected position point identifier through a sensor of the robot to obtain a present position and posture of the robot, and calibrating an advancing direction according to the present position and posture of the robot.

6. The path planning system of claim 1, wherein the at least one computer-readable instruction is further executed by the processing equipment to implement the following operations:
analyzing whether there is an obstacle required to be avoided by a movement in the present movement path or not in real time; and if it is analyzed that there is the obstacle required to be avoided by the movement, determining a present position as a new first position point, analyzing a path from the new first position point to the second position point according to the set reference positioning points and the predetermined path analysis rule, and controlling the robot to move to the second position point on the basis of the analyzed path.

7. A robot, comprising a processing equipment and a storage equipment, wherein a path planning system for the robot is stored in the storage equipment, the path planning system for the robot comprises at least one computer-readable instruction, and the at least one computer-readable instruction is executed by the processing equipment to implement the following operations:

preselecting one or more position points from paths on which the robot move in a predetermined regional map as reference positioning points; and if an instruction of moving the robot from a first position point to a second position point is received, analyzing a path from the first position point to the second position point according to the set reference positioning points and a predetermined path analysis rule, and controlling the robot to move to the second position point on the basis of the analyzed path, wherein the predetermined path analysis rule comprises: determining a first reference positioning point closest to the first position point and a second reference positioning point closest to the second position point planning first paths from the first position point to the first reference positioning point and from the second position point to the second reference positioning point according to a first preset planning manner; and planning a second path from the first reference positioning point to the second reference positioning point to obtain a second planned path according to a second preset planning manner;

wherein the second planning manner comprises the following steps: h1: determining optional planned paths corresponding to the first reference positioning point and the second reference positioning point according to a predetermined mapping relationship between the first reference positioning point, the second reference positioning point and the optional planned paths; h2: calculating a score corresponding to each optional planned path according to a predetermined scoring rule; h3: if there is only one optional planned path with a highest score, determining the optional planned path as the second planned path from the first reference positioning point to the second reference positioning point and h4: if there are multiple optional planned paths with the highest score, randomly selecting one optional planned path from the multiple optional planned paths with the highest score as the second planned path from the first reference positioning point to the second reference positioning point;

wherein the step h2 comprises: performing scoring according to a walking distance influence factor, a walking time influence factor and/or an obstacle influence factor corresponding to each optional planned path, wherein the score corresponding to each optional planned path is a total score of paths between every two adjacent nodes in the optional planned path under the walking distance influence factor, the walking time influence factor or the obstacle influence factor;

wherein a scoring formula for the optional planned path is as follows:

Score(path)=a·o(t)+b·o(d)

Where o(t) is a time score of the optional planned path, o(d) is a distance score of the optional planned path, and a and b are predetermined weights; a time score $o_i(t)$ of the $i^{th}$ optional planned path is defined to be:

$$o_i(t) = \frac{T(\text{path}_i)}{\min[T(\text{path}_1), T(\text{path}_2), \ldots, T(\text{path}_n)]} \text{ and}$$

-continued $$T(\text{path}_i) = \Sigma\left(k_{ti} \cdot \frac{d_i}{v_i} \cdot P_i + \frac{d_i}{v_i} \cdot (1 - P_i)\right),$$

where $T(\text{path}_1)$ $T(\text{path}_2)$ ... $T(\text{path}_n)$ are time used for a movement of the robot to a target point under the different optional planned paths, $T(\text{path}_i)$ time used for the movement of the robot to the target point under the $i^{th}$ optional planned path, $k_{ti}$ represents a time penalty coefficient of the $i^{th}$ optional planned path, the time penalty coefficient is an additional time cost by the robot in passing over an obstacle in the $i^{th}$ optional planned path, $d_i$ represents the path length of the $i^{th}$ optional planned path, $v_i$ represents a velocity of the robot in the $i^{th}$ optional planned path, and $P_i$ represents a probability of an appearance of the obstacle in the $i^{th}$ optional planned path; and a distance score $o_i(d)$ of the $i^{th}$ optional planned path is defined to be:

$$o_i(d) = \frac{d(\text{path}_i)}{\min[d(\text{path}_1), d(\text{path}_2), \ldots, d(\text{path}_n)]} \text{ and}$$

$$d(\text{path}_i) = \Sigma(k_{di} \cdot d_i \cdot P_i + d_i \cdot (1 - P_i)),$$

where $d(\text{path}_1)$ $d(\text{path}_2)$ ... $d(\text{path}_n)$ are walking distances for the movement of the robot to the target point under the different optional planned paths, $k_{di}$ represents a distance penalty coefficient of the $i^{th}$ optional planned path, and the distance penalty coefficient is an additional distance by which the robot is required to move to pass over the obstacle in the $i^{th}$ optional planned path.

8. The robot of claim 7, wherein the first planning manner comprises:

if there is no obstacle between the first position point and the first reference positioning point, adopting a straight-line path between the first position point and the first reference positioning point; if there is no obstacle between the second position point and the second reference positioning point, adopting the straight-line path between the second position point and the second reference positioning point;

if there is a first obstacle between the first position point and the first reference positioning point, adopting a first shortest path avoiding the obstacle between the first position point and the first reference positioning point; and if there is a second obstacle between the second position point and the second reference positioning point, adopting a second shortest path avoiding the obstacle between the second position point and the second reference positioning point.

9. The robot of claim 7, wherein the at least one computer-readable instruction is further executed by the processing equipment to further implement, between an implementation of the step h1 and the step h2, the following operation:

screening optional planned paths comprising predetermined specific reference positioning points from each optional planned path, and determining the screened optional planned paths as optional planned paths to be scored; and/or, calculating a total length corresponding to each optional planned path according to a predetermined calculation formula, calculating a difference value between the total length of each optional planned path and a total length of the shortest path from the first reference positioning point to the second reference positioning point, and screening the optional planned paths of which the difference values are smaller than a preset threshold value as the optional planned paths to be scored.

10. The robot of claim 7, wherein the at least one computer-readable instruction is further executed by the processing equipment to implement the following operation:
analyzing whether there is an obstacle required to be avoided by a movement in the present movement path or not in real time; and if it is analyzed that there is the obstacle required to be avoided by the movement, determining a present position as a new first position point, analyzing a path from the new first position point to the second position point according to the set reference positioning points and according to the predetermined path analysis rule, and controlling the robot to move to the second position point on the basis of the analyzed path.

11. The robot of claim 7, wherein the at least one computer-readable instruction is further executed by the processing equipment to implement the following operation:
setting a corresponding position point identifier at a position corresponding to each reference positioning point in the predetermined regional map; and
performing positioning in real time, analyzing whether the present position is in a triggering coordinate region of a reference positioning point or not according to a predetermined mapping relationship between a reference positioning point and a triggering coordinate region, if the present position is in the triggering coordinate region of the reference positioning point, turning on an position point identifier recognition equipment to start to detect the position point identifier, and when the position point identifier is detected, calculating a distance and direction between the robot and the detected position point identifier through a sensor of the robot to obtain a present position and posture of the robot and calibrating an advancing direction according to the present position and posture of the robot.

12. A non-transitory computer-readable storage medium, which stores at least one computer-readable instruction executable for at least one piece of processing equipment to implement the following operations:
preselecting one or more position points from paths on which the robot move in a predetermined regional map as reference positioning points; and
if an instruction of moving the robot from a first position point to a second position point is received, analyzing a path from the first position point to the second position point according to the set reference positioning points and according to a predetermined path analysis rule, and controlling the robot to move to the second position point on the basis of the analyzed path, wherein the predetermined path analysis rule comprises: determining a first reference positioning point closest to the first position point and a second reference positioning point closest to the second position point; planning first paths from the first position point to the first reference positioning point and from the second position point to the second reference positioning point according to a first preset planning manner; and planning a second path from the first reference positioning point to the second reference positioning point to obtain a second planned path according to a second preset planning manner;
wherein the second planning manner comprises the following steps: h1: determining optional planned paths corresponding to the first reference positioning point and the second reference positioning point according to a predetermined mapping relationship between the first reference positioning point, the second reference positioning point and the optional planned paths; h2: calculating a score corresponding to each optional planned path according to a predetermined scoring rule; h3: if there is only one optional planned path with a highest score, determining the optional planned path as the second planned path from the first reference positioning point to the second reference positioning point; and h4: if there are multiple optional planned paths with the highest score, randomly selecting one optional planned path from the multiple optional planned paths with the highest score as the second planned path from the first reference positioning point to the second reference positioning point;
wherein the step h2 comprises: performing scoring according to a walking distance influence factor, a walking time influence factor and/or an obstacle influence factor corresponding to each optional planned path, wherein the score corresponding to each optional planned path is a total score of paths between every two adjacent nodes in the optional planned path under the walking distance influence factor, the walking time influence factor or the obstacle influence factor;
wherein a scoring formula for the optional planned path is as follows:

Score(path)=a·o(t)+b·o(d)

Where o(t) is a time score of the optional planned path, o(d) is a distance score of the optional planned path, and a and b are predetermined weights; a time score $o_i(t)$ of the $i^{th}$ optional planned path is defined to be:

$$o_i(t) = \frac{T(\text{path}_i)}{\min[T(\text{path}_1), T(\text{path}_2), \ldots, T(\text{path}_n)]} \text{ and}$$

$$T(\text{path}_i) = \sum \left( k_{ti} \cdot \frac{d_i}{v_i} \cdot P_i + \frac{d_i}{v_i} \cdot (1 - P_i) \right),$$

where $T(\text{path}_1)$ $T(\text{path}_2)$ ... $T(\text{path}_n)$ are time used for a movement of the robot to a target point under the different optional planned paths, $T(\text{path}_i)$ is time used for the movement of the robot to the target point under the $i^{th}$ optional planned path, $k_{ti}$ represents a time penalty coefficient of the $i^{th}$ optional planned path, the time penalty coefficient is an additional time cost by the robot in passing over an obstacle in the $i^{th}$ optional planned path, $d_i$ represents the path length of the $i^{th}$ optional planned path, $v_i$ represents a velocity of the robot in the $i^{th}$ optional planned path, and $P_i$ represents a probability of an appearance of the obstacle in the $i^{th}$ optional planned path; and a distance score $o_i(d)$) of the $i^{th}$ optional planned path is defined to be:

$$o_i(d) = \frac{d(\text{path}_i)}{\min[d(\text{path}_1), d(\text{path}_2), \ldots, d(\text{path}_n)]} \text{ and}$$

$$d(\text{path}_i) = \sum (k_{di} \cdot d_i \cdot P_i + d_i \cdot (1 - P_i)),$$

where $d(\text{path}_1)$ $d(\text{path}_2)$ ... $d(\text{path}_n)$ are walking distances for the movement of the robot to the target point under the different optional planned paths, $k_{di}$ represents a distance penalty coefficient of the $i^{th}$ optional planned path, and the distance penalty coefficient is an additional distance by which the robot is required to move to pass over the obstacle in the $i^{th}$ optional planned path.

* * * * *